Oct. 17, 1967 W. M. ROSS 3,348,230
RECORDING INDICATORS FOR PULSE-ECHO TYPE DETECTION SYSTEMS
Filed Jan. 13, 1964 3 Sheets-Sheet 1

INVENTOR
WAYNE M. ROSS
BY
Reynolds & Christensen
ATTORNEYS

INVENTOR
WAYNE M. ROSS

BY
*Reynolds & Christensen*

ATTORNEYS

United States Patent Office 3,348,230
Patented Oct. 17, 1967

3,348,230
RECORDING INDICATORS FOR PULSE-ECHO TYPE DETECTION SYSTEMS
Wayne M. Ross, Seattle, Wash., assignor to Ross Laboratories, Inc., Seattle, Wash., a corporation of Washington
Filed Jan. 13, 1964, Ser. No. 337,428
11 Claims. (Cl. 346—33)

ABSTRACT OF THE DISCLOSURE

This recording indicator for sonars and similar devices employs an endless stylus carrier belt stabilized on a slide bar and having its stylus provided with oppositely directed electrical contactor and recording stylus tips which tend to eliminate belt torsion and thus stabilize the belt. Sonar keying at any of selected recurrence frequencies is achieved by electromagnetic keying coils stationarily positioned along the lines of movement of respective bar magnets mounted on the exterior surface of the belt, with the north pole of one such magnet being directed forwardly and that of the other such magnet being directed rearwardly in relation to the direction of movement of the belt, thereby preventing the magnet in one path from inducing trigger voltage in the coil adjacent the path of the other magnet, so that a narrow belt may be used. An adjustable common support for the keying coils may be shifted in position parallel to the direction of belt movement, thereby to vary the relative phasing between stylus sweep across the recording medium and keying impulses applied to the sonar transmitter.

This invention relates to improvements in recording indicators which may be used in underwater sonar and similar object detection systems, and more particularly concerns recorders with provisions for range interval selection, electromagnetic keying of the sonar transmitter and sweep scale adjustment. The invention is herein illustratively described by reference to the presently preferred embodiment thereof; however, it will be recognized that certain modifications and changes therein with respect to details may be made without departing from the essential features involved.

The large majority of commercially available recording indicators operate on the principle of sweeping a stylus electrode across the surface of electrically sensitive chart paper in synchronism with the periodically emitted sonar impulses. The opposite surface of the chart paper is supported in electrical contact with a conductive platen serving as an electrode opposing the stylus electrode. Received echo pulses are recorded by converting them into electrical signals applied to the electrodes to produce an electrical discharge through the paper which darkens or otherwise discolors the material at the range location of the reflecting object. By advancing the chart paper progressively in a direction transverse to the stylus sweep the system produces a continuous permanent record of the presence and range position of objects in the field of search.

An object of the present invention is to devise an improved stylus, stylus carrier, and associated means for applying electrical signals to the stylus during its sweep across the recording paper.

A further object is to provide in conjunction with the improved stylus carrier mechanism more satisfactory arrangements than heretofore by which to adjust the "zero setting" of the stylus in relation to the recording paper as a function of transmitted pulse timing in the sonar system. In this regard it will be recognized that adjustment of the zero setting of the stylus permits compensation for such factors as stylus wear, electrical delays in the transmitted pulse synchronizing circuits, and any slight mechanical displacements which may occur in the elements establishing phase relationship between relative positioning of the stylus and of the means for producing transmitter synchronizing impulses.

Still another object hereof is to devise an improved stylus carrier mechanism which will sweep the stylus across chart paper in consistently reliable manner and under mechanically and electrically stabilized conditions. A related object is to devise a new and improved belt type stylus carrier of a reliable and simple construction which produces consistently repeatable recordings free of inaccuracies due to such factors as slippage, stretch or wear of a flexible belt. A further object is to devise such a carrier incorporating reliably accurate transmitter keying. In this regard it is also a purpose of the invention to provide a simple and compact electromagnetic keying device which in no way interferes with the means for maintaining belt tension, and also which permits selective keying of the sonar transmitter at different perdetermined points of time in advance of the recording sweep interval of the stylus, thereby to select range interval recorded by the device.

A further object is to provide a convenient means to effect zero adjustments of the timing relationship between stylus sweep and sonar transmission independently of selective changes of range interval.

Still another object is to devise an improved means for changing stylus carrier speed so as to provide a normal sweep scale and an expanded sweep scale in the recordings.

In accordance with the invention as herein disclosed the stylus is mounted on an endless, flat nonstretchable flexible belt guided around sheaves and placed under controlled tension by an adjustable spring-loading support for one sheave. A detachable mounting clip secures the stylus on one projecting end of a belt-mounted bar to press against the recording paper. The opposite end of this bar, projecting from the belt's opposite edge, carries an electrical pickup positioned to slide in electrical contact with a stationary signal bus during the operating sweep of the stylus, and thus serves not only to communicate electrical signals to the stylus but to help balance belt torsion due to stylus reaction force on the paper. This balancing effect acting complementally to a guide surface on which the belt may slide freely between sheaves in moving along the recording stretch stabilizes the belt and stylus mechanically. Additional features reside in the mounting of small bar magnets on the belt at relatively offset positions in which they pass over selectively related electromagnetic keying coils of an assembly which is positionally adjustable in relation to the recording platen so as to permit the desired zero adjustment of transmitter pulse timing. Selector switches permit connecting individual coils to the transmitter synchronizing circuit, the individual coil branch circuits thus connected each including unidirectionally conductive elements (i.e. rectifiers) preventing coil interactions or loading of the keying amplifier by the coils when coils are simultaneously paralleled. By mounting the transversely offset bar magnets with the north pole of one directed forwardly and the north pole of the other directed rearwardly in relation to belt movement and by connecting the coils associated with one magnet with an effective polarity opposite that of the coils associated with the other magnet individual keying coils may be mounted immediately adjacent each other for the sake of compactness (i.e. minimization of belt width) without cross-interference between magnets and coils.

These and other features, objects and advantages of the invention will become more fully evident from the following description thereof by reference to the accompanying drawings.

Figure 1:
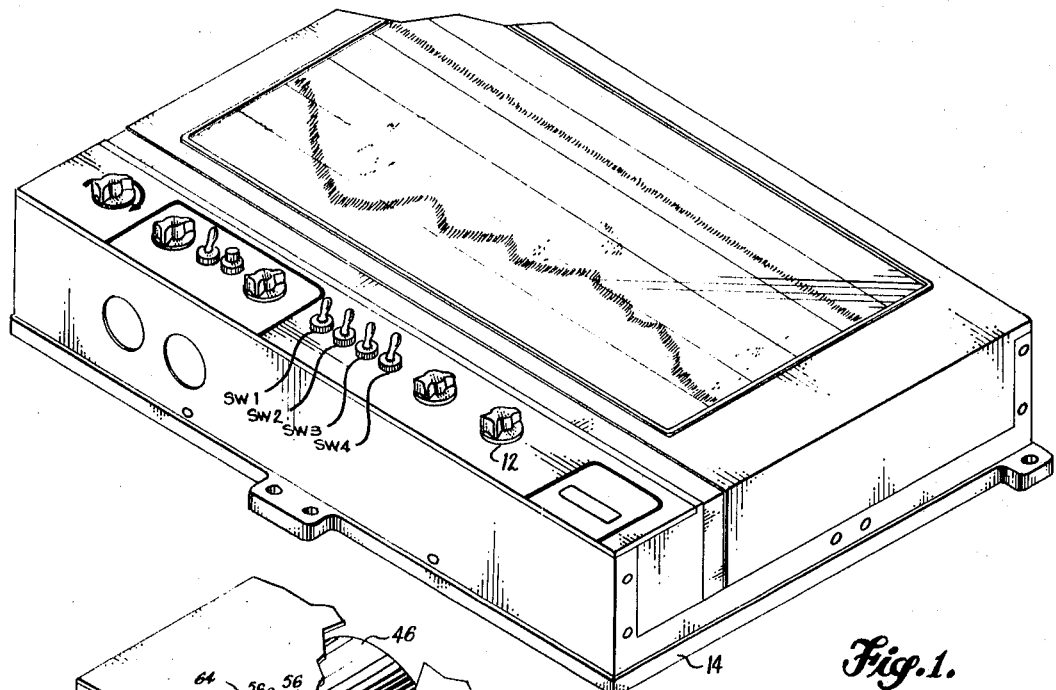
FIGURE 1 is a perspective view of the exterior of a representative housing and controls for a recording indicator of this invention.

Referring to the drawings, chart paper C of the described type is advanced progressively in a reverse band around the smoothly curved end edge and across the substantially flat top face of an electrode platen 10 by drive means not shown. A paper feed control knob 12 mounted on the face panel of the housing 14 permits varying the drive speed of the paper in conventional or suitable manner so as to establish the desired spacing between successive stylus traces on the paper. Stylus electrode 16 is mounted on the flat endless carrier belt 18 to sweep across the top surface of the paper C along a line which is located in parallel relationship to the end edge of the platen 10 adjacent the endless belt. For this purpose the carrier belt 18, preferably of a nonstretchable rubberized fabric of suitable or known type, encircles the spaced drive sheave 20 and idler sheave 22 which position the top stretch of belt closely adjacent the end edge of platen 10 and in approximately coplanar (or offset parallel) relationship with the recording surface for proper positioning of the stylus during its recording sweep. The recording or top stretch of belt rides in sliding contact with the flat elongated top surface of the stationary guide 24, which helps stabilize the belt during the recording sweep. This helps avoid fluctuations of stylus pressure on the recording paper which could impair reliability of the recordings.

As a further measure in stabilizing the belt and more specifically the stylus during its transit across the recording paper, the stylus 16 is mounted on one projecting end of a conductive bar 26 riveted or otherwise secured to the belt 18 with its opposite ends projecting beyond opposite edges of the belt. The stylus 16 comprises an elongated spring strip 16a mounted in trailing position on bar 26 and formed with a downwardly curved electrode tip which presses against the recording paper. Mounted in like trailing position on the opposite end of bar 16 is a conductive leaf spring contactor 28 which presses in sliding contact with the stationary electrical bus bar 30 mounted adjacent the upper stretch of belt at the side thereof opposie platen 70. Reaction pressure on the belt from this contactor tends to offset reaction pressure from the stylus and thereby to minimize torsion in the belt and instability of stylus pressure on the recording paper.

Opposite its tip, the resilient stylus strip is formed with a reverse bend to provide a U-shaped spring clip 16b. This U-shaped clip has a flat lower side which is a widened continuation of the shank of stylus arm 16a and has an inwardly curved upper side which turns outwardly at its terminus. The inner extremity of this upper side serves as a detent of elongated form which snaps into an elongated slot or recess 26a formed longitudinally in the projecting end of the bar 26. As a result the stylus unit is held removably on the bar 26 with the stylus arm oriented generally parallel to the belt. Ease of removing and replacing styli, afforder by this construction, is of course desirable when it is necessary to redress the point of a worn stylus or to replace a deteriorated stylus with a new one.

The sonar receiver output is connected electrically to the bus bar 30 thereby to communicate electric signal impulses through contactor 28 and conductive bar 26 to the stylus 16.

Figure 2:
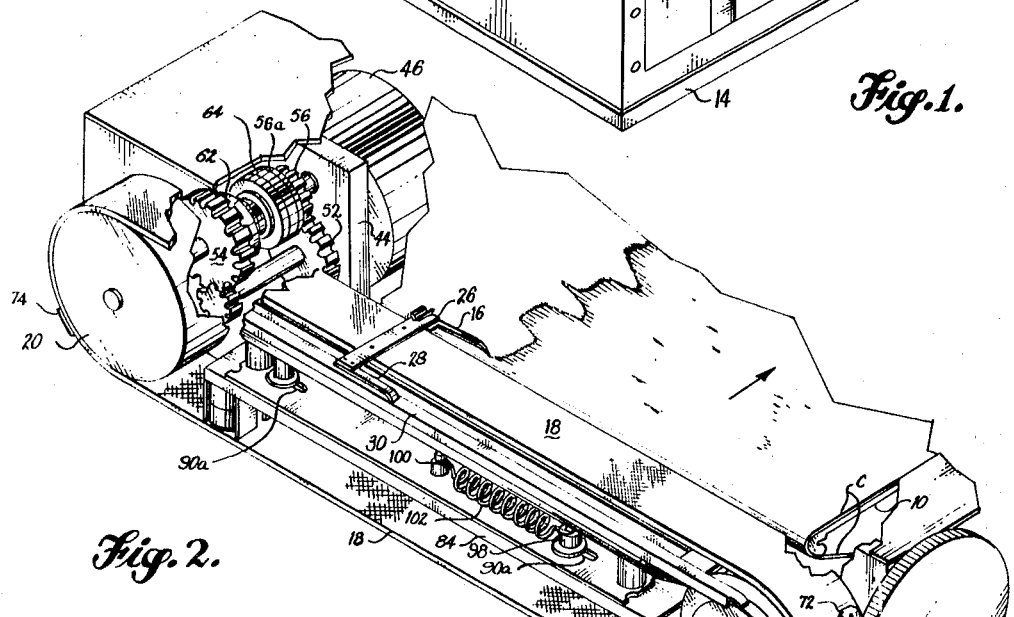
FIGURE 2 is a perspective view at an enlarged scale showing the stylus mechanism and drive, and the relationship thereof to the recording platen and chart paper, portions being broken away for convenience in illustration.
Figures 8, 9:
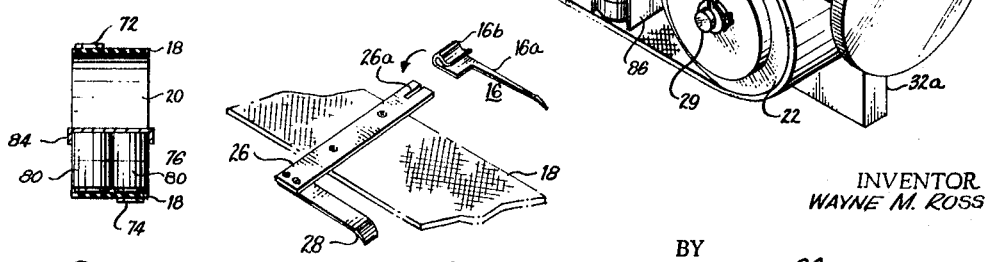
FIGURE 8 is a sectional detail of the belt and associated keying lements, the view being taken on line 8—8 in FIGURE 3.
FIGURE 9 is a perspective detail view showing stylus construction and mounting arrangement.
Figure 3:
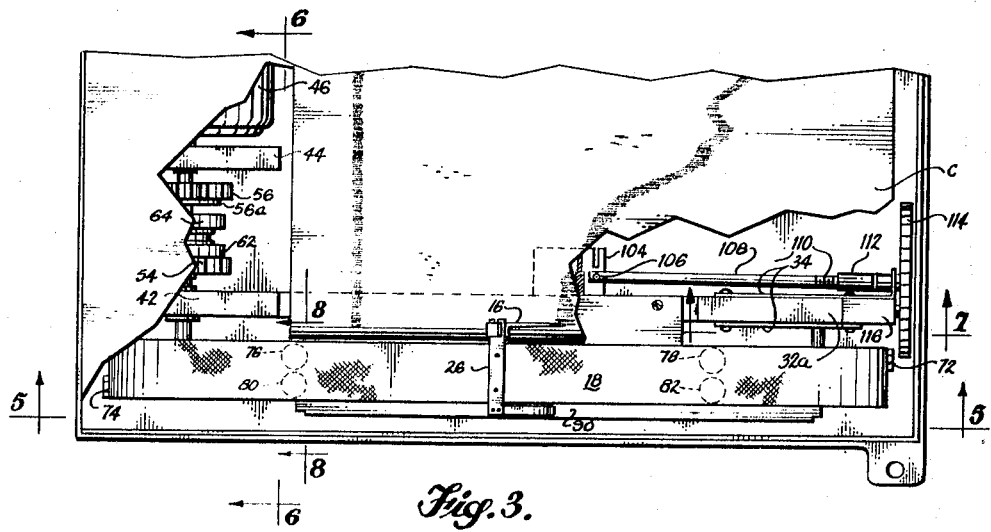
FIGURE 3 is a top view of the assembled means shown in FIGURE 2.
Figure 4:
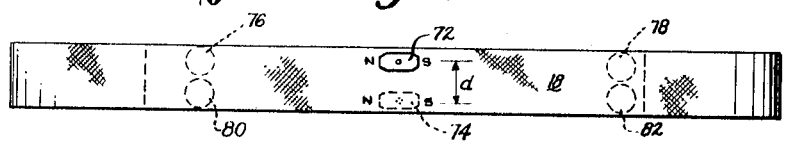
FIGURE 4 is a top view of the carrier belt showing the relationship of bar magnets and the pairs of keying coils operatively associated therewith.

In order to adjust carrier belt tension to a desired value and maintain such tension constant, the idler sheave 22 is mounted on an axle or shaft 29 journaled in a slider 30. The slider 30 is received in a conforming slot 32 the length of which exceeds that of the slider 30 but which has the same height, with just sufficient clearance to permit free sliding action of the slider lengthwise in the slot 32. End plates 34 mounted against opposite sides of the pillow block unit 32a in which the slot 32 is formed are slidably contacted by opposite sides of the slider 30 to keep the slider from tilting or canting as a result of belt tension. One of these plates has an elongated opening 34a therein which permits the shaft 29 to project from the corresponding side of the slider 30 in order to mount the sheave 22 thereon without interfering with slider adjustment. A belt tensioning screw 36 and encircling spring 38 are received in a bore 32b formed in the end of the pillow block adjacent the slot 32 therein and the end of the screw is threaded into the slider 30 with the spring 38 entrapped between the screw head 36 and the base of the bore 32b. The screw passes freely through a counterbored portion 32c in the pillow block. Thus, turning of the screw in one direction or the other increases or decreases the compressive force in spring 38 to increase or decrease carrier belt tension to a desired value. As shown in FIGURE 2, pillow block 32a is mounted on or comprises a frame member of the housing structure 14.

Figure 6:
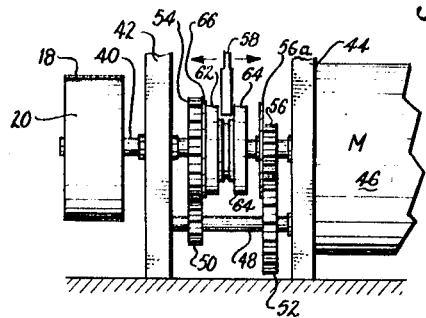
FIGURE 6 is a sectional detail view taken on line 6—6 of FIGURE 3.
Figure 7:
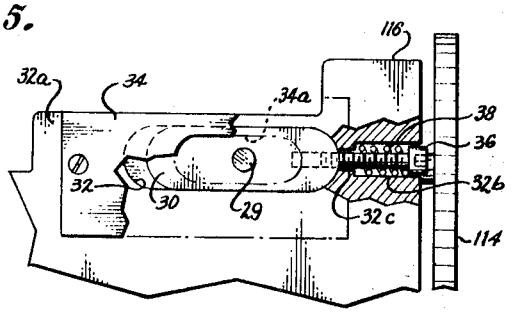
FIGURE 7 is a sectional detail view taken on line 7—7 in FIGURE 3.

Drive sheave 20 is supported and driven by drive shaft 40 journaled in spaced parallel frame plates 42 and 44. Drive motor 46 is mounted on the plate 44 and turns an output shaft 48 carrying thereon in spaced relation a small driven gear 50 and a large driven gear 52. These two gears mesh respectively with a larger idler gear 54 and a relatively small idler gear 56, both mounted to turn freely on shaft 40. A two-speed clutch mechanism controlled by a shifting arm or lever 58 determines by its setting the speed by which the drive sheave 20 is turned, with the motor 46 operating at constant speed. This mechanism comprises two permanently magnetized disks 62 and 64 keyed to shaft 40 in spaced relation to accommodate the end of the shifting arm 58 between them. These disks are magnetized in a known manner so that their magnetic poles are located on one end face only, that is the magnetic flux emanates from and returns to only one circular end face of each disk. A ferromagnetic armature plate 56a is fixed on the side of gear 56 which is adjacent to the magnet disk 64 and a similar ferromagnetic armature plate 66 is likewise fixed on the face of gear 54 adjacent the magnet disk 62. When the shifting arm 58 is advanced to the left in FIGURE 6, magnet 62 is drawn into firm frictional engagement with the plate 66 to complete a drive connection between the gear 54 and the shaft 40 to which the magnet assembly is keyed. Magnetic attraction holds the parts in this position until separated forcibly by the shifting arm 58 shifting the dual magnet unit lengthwise of shaft 40 to engage magnet 64 with armature plate 56a and thereby complete a drive connection between gear 56 and shaft 40. There are no wearable sliding parts, the construction is simple and the clutching action of this two-speed transmission is both positive and reliable. The purpose of such a two-speed drive is to enable expanding the sweep scale of the stylus 16 when desired in order to permit amplified or expanded display of signals in a given range interval.

Figure 5:
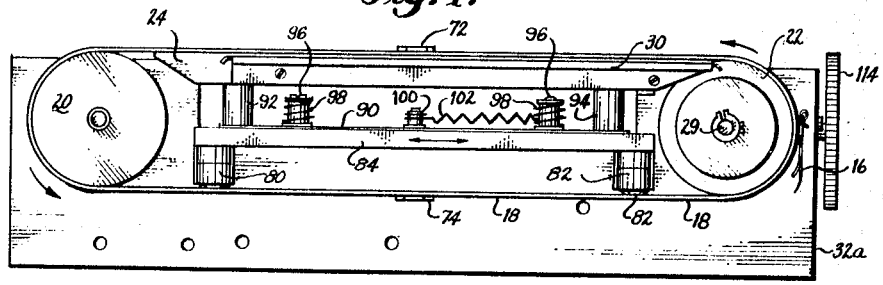
FIGURE 5 is a transverse sectional view taken on line 5—5 in FIGURE 3.

In order to produce transmitter trigger pulses in timed relationship with stylus sweep so as to record signals received from objects in any of different selected range intervals, two (the number could differ) permanent bar magnets 72 and 74 are mounted in fixed positions on the moving stylus carrier belt 18 to induce transient impulses in stationary induction coils. In the example two such bar magnets 72 and 74 are mounted on the carrier belt in relative positions offset transversely (i.e. their paths of motion) by a distance $d$ and in positions spaced apart lengthwise on the belt, in this case by half its length. Bar magnet 72 is oriented with its north pole directed forwardly while bar magnet 74 has its north pole directed rearwardly for a reason to be explained. Bar magnet 72 cooperates with stationary induction coils 76 and 78, whereas bar magnet 74 cooperates with stationary induction coils 80 and 82. Coils 76 and 80 are placed in adjacent relationship on a line transverse to the planes of movement of the magnets. Coils 78 and 82 occupy a similar relationship. The two pairs of coils 76, 78 and 80, 82 are mounted in depending position on the lower side of a carrier plate 84 with the lower pole faces of the coils (or their central cores) in position to be in sliding contact with the upper surface of the lower stretch of belt 18. Sliding contact of the belt with these coil core or end surfaces helps damp out any tendency for belt flutter which could alter the shape or sharpness of impulses induced in the respective coils during passage of their associated bar magnets, and thereby could disturb the timing of sonar pulse transmission in relation to stylus position on the recording paper C. Ferromagnetic side plates 86 placed adjacent opposite sides of the respective coils as shown (FIGURES 2 and 5) help shield the coils from extraneous magnetic fields which could disturb induced pulse shape; also these plates provide a low-reluctance flux path which maximizes the amplitude of transmitter trigger pulses induced in the coils. The spacing longitudinally of the belt between coils 80 and 82 and the corresponding spacing between coils 76 and 78 in the example is one-fourth the belt's length. The four coils are connected in separate arms of a selector switching circuit with the coils of one pair having subtractive polarity and the coils of the other pair having additive polarity (i.e. such that each coil applies a trigger pulse of a given polarity to the transmitter). By selective switching any one coil or any combination of the four coils may be selected for application to the sonar transmitter as will be described in connection with FIGURE 10 hereinafter.

Adjustment of the phasing of the induced trigger pulses in relation to stylus position is accomplished for all of the coils by mounting the coil support plate 84 for adjustive positioning lengthwise of the belt stretches. To this end the plate 84 is held in sliding contact with the underside of a stationary plate 90. The latter is held by posts 92 and 94 in fixed position lying at a height generally midway between the upper and lower stretches of the belt 18 and extending lengthwise of the space defined between those stretches. The plate 90 is slotted at 90a. Pins 96 project from plate 84 up through the slots 90a and carry enlarged heads against which the respective coil springs 98 react upwardly from the upper face of the stationary plate 90 in order to hold the plate 84 in firm frictional contact with the underside of the plate 90. A stationary post 100 mounted on the upper side of plate 90 serves as an anchor point for a helical spring 102 which extends to the post 96 and tends to draw the plate 84 in one direction lengthwise of the plate 90. A sidearm 104 mounted on plate 84 has an upstanding anchor pin 106 engaged by the end of a rod 108 extending therefrom parallel to the plate 84. The opposite end of the rod 108 is threaded at 110 in a sleeve 112 which may be turned by a knurled nut 114. The sleeve 112 is journaled for rotation in a bracket 116 to permit such turning while the rod is held against turning by pin 106. When the sleeve is turned by rotation of the knob 114, the rod 108 is advanced lengthwise one way or the other depending upon the direction of turning, such movement being effected against or with the recoil force of the spring 102. Spring 102 holds the interconnected parts 104, 108 and 112 in fixed relationship against the effects of free play so as to insure that the plate 84 and thereby the induction coils will remain in a given position despite vibrations in the recorder yet may be adjusted to any new position as desired by turning of the knob 114. For purposes of quick disassembly, the apertured end of the rod 108 lifts directly off the pin 106.

Figure 10:
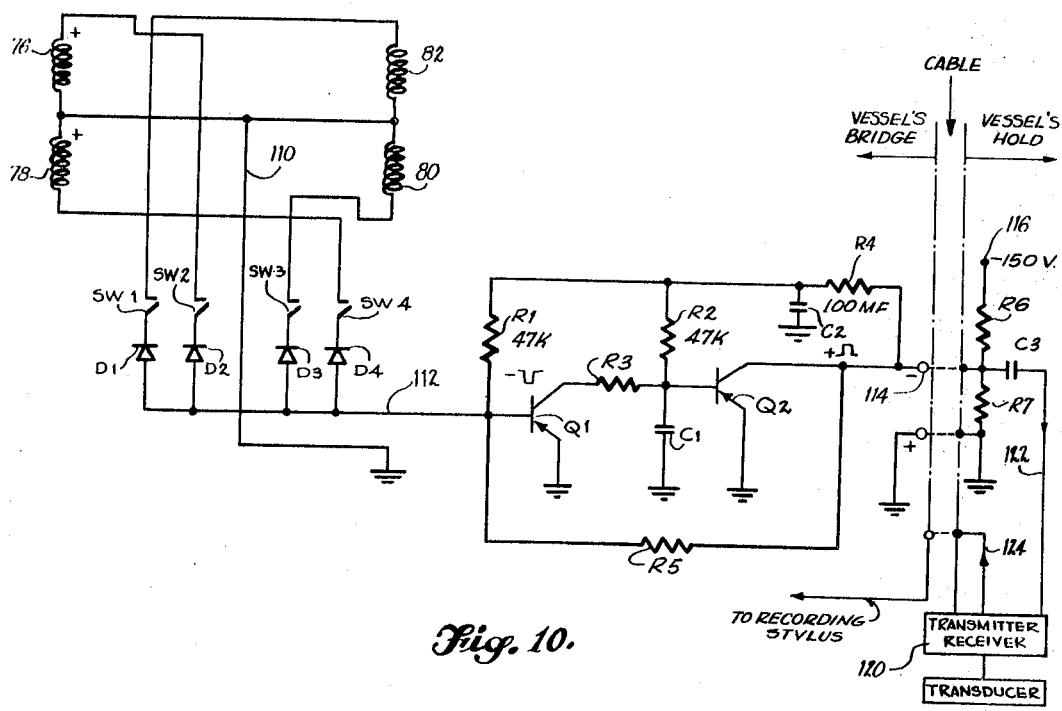
FIGURE 10 is a schematic diagram of the recording indicator and associated apparatus.

As shown in FIGURE 10, coils 76, 78, 80 and 82 have a common junction 110 which is grounded and have opposite terminals connected to one side of the individual selector switches SW1, SW2, SW3 and SW4. The latter in turn extend through the respective diode rectifiers D1, D2, D3 and D4 to a common output conductor 112 connected to the base of the common emitter amplifier transistor $Q_1$. The relative polarities are such that a negative pulse is applied to the transistor base each time one of the bar magnets 72 or 74 passes an associated induction coil. The transistor collector is connected through resistance $R_3$ to the base of a succeeding amplifier transistor $Q_2$ to produce an output pulse of positive polarity therefrom at the collector of the latter. A positive feedback connection, including a resistance $R_5$, interconnects the collector of transistor $Q_2$ with the base of transistor $Q_1$ to sharpen the leading edge of the amplified pulses. A source of negative direct voltage applied at terminal 114 (from remote source terminal 116) is connected by a filter resistance $R_4$ and by-pass condenser $C_2$ through the respective bias resistances $R_1$ and $R_2$ to the base electrodes of the respective transistors $Q_1$ and $Q_2$. Condenser $C_1$ connected between ground and the base of transistor $Q_2$ cooperates with resistance $R_3$ as a filter which eliminates unwanted noise spikes at the base of transistor $Q_2$. Power supply terminal 114 also serves as the impulse output terminal from the amplifier $Q_2$ and extends through an electrical cable as shown from the vessel's bridge, in which the recording indicator apparatus and amplifier are usually located, to the vessel's hold in which the sonar transmitter-receiver and power supply unit are normally located. Loading resistors $R_6$ and $R_7$ terminate the cable line for trigger impulses received at the transmitter end. In the hold of the vessel the transmitter-receiver unit 120 includes an input trigger lead 122 by which amplified trigger impulses from the recording indicator are applied to the transmitter. A receiver output lead 124 carries amplified electrical impulses from the receiver to the transmission cable for application to the recording stylus of the indicator.

By spacing the coils of each pair one-fourth belt length apart and by locating the keying magnets 72 and 74 one-half belt length apart, it is possible to select any one of four equal segments of the total range interval of the sonar system for purposes of recording the received echoes on the chart paper C. In fact, two or more of the switches SW1, SW2, etc., may be closed at the same time if desired. This might happen, for example, in the event a fisherman searching one range sector finds no echo signals corresponding to commercial concentrations of fish and without reversing the position of the closed switch simply actuates and closes the switch of a second, adjacent range sector to see if it changes the pattern of recordings. If then or later a fish concentration is indicated in one or more of the range intervals being covered by the same stylus traces, it is a simple process of elimination (i.e. by opening switches) to determine which of the range sectors holds the fish. Because in a sonar system of the type described it is conventional and desirable to employ a time-varied cyclic gain control circuit in the receiver, each time the transmitter fires the receiver gain is reduced and is permitted to recover progressively throughout out a succeeding interval of time. Thus, the effect of switching in an additional keying coil whose keying impulse occurs at a later point in the total range cycle than that of a coil already in circuit is not only to transmit a succeeding impulse from the sonar transmitter but to momentarily reduce the received gain. The effect of this if successively closer range intervals are being selected by closing additional switches is to more greatly attenuate or suppress signals from the more outlying sector or sectors, a factor which the operator takes into consideration in interpreting the recordings being made. He may then, if desired, change the sweep speed within a given range sector (i.e. by actuating the means to move the shifting arm 58 of the transmission from its normal speed position to its high speed position) so as to obtain a more precise indication of depth of the fish on an expanded scale.

These and other features and advantages of the invention will be recognized on the basis of the disclosed embodiment thereof, which is intended as an illustration and not a necessary limitation of the characterizing essentials thereof.

I claim is my invention:

1. A recording indicator for use with a pulse-echo type detection system having a periodically pulse-operated transmitter and a cooperable receiver, mutually opposing recording electrodes and means to advance a recording medium between said electrodes, one of said electrodes comprising a point stylus, an endless carrier belt for said stylus including means to drive the belt lengthwise, spaced belt sheaves guiding said belt with one stretch thereof movable along the recording medium surface, an elongated belt-supporting member extending between said guide sheaves along said stretch and slidably contacted by the belt to stabilize the same during movement along said stretch, means for mounting and electrically energizing said stylus on said belt, permanent magnet means secured to said belt at a location spaced lengthwise thereon from the stylus, and magnetic induction coil means mounted in stationary position to be traversed by magnetic field from said permanent magnet means when passing said coil means, said coil means having output connections adapted to deliver induced trigger pulses for application to the transmitter.

2. The recording indicator defined in claim 1, wherein the magnet means comprises permanent magnets mounted on the exterior surface of the belt and wherein the means mounting the stylus on the belt includes an electrically conductive elongated bar secured transversely to the belt with ends projecting beyond respectively opposite edges of the belt, means securing the stylus on one such end in such manner as to bear forcibly upon the recording medium surface when moving along said stretch, and means including an electrically energizable stationary conductive bus member extending along said belt stretch, and an electrical contactor secured on the other such end in such manner as to bear forcibly upon said bus member.

3. The recording indicator defined in claim 1, wherein the permanent magnet means comprises at least two permanent magnets mounted at respective locations spaced apart lengthwise of the belt and in paths of movement mutually offset transversely of the belt, and wherein the magnetic induction coil means comprises at least two separate coils proximately positioned in cooperative relationship with the respective paths of movement of said permanent magnets.

4. The recording indicator defined in claim 3, wherein one of the permanent magnets has a north pole directed rearwardly and the other a north pole directed forwardly in relation to the direction of belt movement, and means including independently operable selector switches in the respective output connections of said coils adapted for selectively or cumulatively connecting the respective coils to the transmitter with relatively opposite polarity of the coil windings, whereby stray fields from one magnet inducing an impulse in the noncooperating coil does so with a pulse polarity opposite the polarity of the pulse generated by such magnet in the coil cooperating therewith.

5. The recording indicator defined in claim 4, wherein the permanent magnet means comprises two magnets longitudinally spaced apart by half the belt's length and wherein the coil means comprises two pairs of separate coils, with the members of one pair positioned in cooperative relationship with the path of movement of one permanent magnet and the members of the other pair positioned in cooperative relationship with the path of movement of the other permanent magnet, with one member of each pair transversely aligned with one member of the other pair, and with the members of each pair spaced apart longitudinally of the belt by one-fourth the belt's length.

6. The recording indicator defined in claim 4, further including a common support for the coils, and means for adjustively positioning said support in a direction parallel to the belt, thereby to vary the relative phasing of impulses generated in the coils with relation to the sweep of the stylus across the recording medium.

7. The recording indicator defined in claim 6, wherein one of the carrier belt guide sheaves is mounted on a support guided for movement toward and from the other guide sheave, spring means connected to act upon said sheave support in a direction away from the other guide sheave, thereby to establish tension in the carrier belt, and means to adjust the force of said spring means.

8. The recording indicator defined in claim 6, including means to drive the carrier belt at either of selectively different speeds.

9. A recording indicator for use with a pulse-echo type detection system having a periodically pulse operated transmitter and a cooperable receiver, a platen electrode having a contact surface to support recording paper thereon and an adjoining elongated guide edge for guiding paper drawn across said surface in a reverse path around said edge, an endless carrier belt, spaced guide sheaves supporting said belt with one stretch thereof extending in parallel adjacent relationship to said guide edge, a recording stylus, means mounting the stylus on said belt in such position as to sweep transversely across recording paper being drawn across said surface, said belt being of generally flat form and the means mounting the stylus thereon comprising a member secured to the belt with one end thereof projecting transversely beyond the edge of the belt adjacent the platen edge to carry the stylus thereon, said means mounting the stylus comprising an electrical connector having an end portion projecting beyond the opposite edge of the belt, an electrical contactor mounted on the latter end of said member, an electrically conductive bus member extending in stationary position along said stretch of belt adjacent the side edge thereof opposite the platen edge, said stylus and contactor respectively bearing against the recording paper and the bus member, and transmitter triggering means comprising magnetic induction means mounted on the exterior surface of the belt, and cooperable stationary magnetic induction means mounted adjacent the inside surface of the belt to be traversed cyclically by the former magnetic induction means for generation of transmitter trigger impulses thereby.

10. The recording indicator defined in claim 9, further including means to shift the position of the stationary magnetic induction means in a sense parallel to the belt and thereby to vary the timing of the impulses in relation to sweep of the stylus across the recording paper.

11. The recording indicator defined in claim 10, further including means to move one carrier belt guide sheeve toward and from the other guide sheave, including spring means urging such guide sheaves relatively apart.

References Cited

UNITED STATES PATENTS

| | | | |
|---|---|---|---|
| 2,596,446 | 5/1952 | Stamper | 346—74 |
| 2,633,405 | 3/1953 | Nelson | 346—139 |
| 2,665,965 | 1/1954 | Blackman | 346—139 |
| 2,759,168 | 8/1956 | Fryklund. | |
| 2,770,517 | 11/1956 | Zabriskie | 346—139 X |
| 2,879,129 | 3/1959 | Alden | 346—139 |
| 3,177,492 | 4/1965 | Dudley | 340—3 |

FOREIGN PATENTS 878,703  10/1961  Great Britain.

BERNARD KONICK, *Primary Examiner.*

L. J. SCHROEDER, *Assistant Examiner.*